United States Patent [19]

Hiroya et al.

[11] Patent Number: 5,481,664
[45] Date of Patent: Jan. 2, 1996

[54] METHOD OF CONTROLLING INFORMATION IN MULTIMEDIA SYSTEM

[75] Inventors: Masaaki Hiroya, Yokohama; Masayuki Saito; Hiroyuki Takagi, both of Atsugi, all of Japan

[73] Assignees: Hitachi, Ltd., Tokyo; Hitachi Keiyo Engineering Co., Ltd., Chiba, both of Japan

[21] Appl. No.: 5,273

[22] Filed: Jan. 19, 1993

[30] Foreign Application Priority Data

Jan. 30, 1992 [JP] Japan .................................. 4-014753

[51] Int. Cl.$^6$ .................................................. G06T 1/00
[52] U.S. Cl. ........................... 395/154; 395/157; 395/152
[58] Field of Search ................................. 395/144–149, 395/152, 154, 155, 157, 600; 345/115, 116, 122, 127–131

[56] References Cited

U.S. PATENT DOCUMENTS 4,914,586  4/1990  Swinehart ..................... 364/200
4,933,880  6/1990  Borgendale .................... 364/523

FOREIGN PATENT DOCUMENTS 62-47737  3/1987  Japan .

Primary Examiner—Heather R. Herndon
Assistant Examiner—Joseph H. Feild
Attorney, Agent, or Firm—Fay, Sharpe, Beall, Fagan, Minnich & McKee

[57] ABSTRACT

For each media information element constituting a display screen image in a multimedia system, main data and attribute data are stored in a storage. After the user copies a media information element from a screen layout to another screen layout, until an attribute of the media information element is altered in either one of the layouts, the main data and/or the attribute data of the media information element is not copied in the storage of the system. Moreover, when the user varies an attribute of a media information element in one of the layouts, only attribute data of the media information element is changed in the storage. The media information includes music pieces and voices in addition to characters and graphic images.

27 Claims, 13 Drawing Sheets

METHOD OF CONTROLLING INFORMATION IN MULTIMEDIA SYSTEM

BACKGROUND OF THE INVENTION

The present invention relates to a method of controlling information in a multimedia system handling various kinds of information.

Recently, there have been broadly developed multimedia systems employing computers handling various kinds of information (to be referred to as media information herebelow) related to various kinds of expressions and representations of such items as a character string, a graphic image, a video image, a moving picture, a music piece, and a voice so as to display these information items on a screen of a display and/or to reproduce such information items in cooperation with a screen image. A multimedia system is disclosed in for example JP-A-62-47737. There exists, for example, a multimedia system in which screen structures (to be referred to as screen layouts herebelow) of a display and switching conditions (to be referred to as transition conditions herebelow) of screen information are beforehand defined so that at an occurrence of an event (for example, a command input from a user) while a screen layout is being displayed on a display, a screen change-over takes place to another screen layout according to a transition condition thus defined in advance. This system is in general called a hyper-media system.

In the hyper-media system, when defining screen layouts, the user may possibly desire to use an identical element (to be referred to a media information element herebelow) of media information in a plurality of screen layouts and/or to modify a portion of a media information element copied from a screen layout before the element is used.

In the former case where an identical element of media information is utilized in a plurality of screen layouts, data related to the media information element need only be stored in a storage of the multi-media system to be shared between the screen layouts.

In this case, however, when the user modifies the media information element on either one of the associated screen layouts, the media information element is modified for all of the related screen layouts.

Moreover, in the latter case where a portion of a media information element transcribed from another screen layout is to be modified, it is only necessary to copy data related to the media information element stored in the storage onto another area thereof so as to use the copied data as the destination screen layout.

However, in this case, when the media information element is copied from the source screen layout onto the destination screen layout, there are used in the storage an amount of storage areas associated with the number of copy operations. Actually, it may occasionally occur that the user does not alter the media information element thus copied. In such a case, the storage area is uselessly consumed for the copy operation.

In addition, also when the media information element is varied after the copy, there are required storage areas in association with the number of copy operations. This implies a problem in the storage capacity of the storage when the media information elements are, for example, bit map data of a large volume of data.

SUMMARY OF THE INVENTION

It is therefore an object of the present invention to provide an information control method of controlling media information while using a reduced storage capacity in a multimedia system.

Media information elements can be represented with main or primary data (for example, when the media information elements are related to character information, the main data includes character codes and/or outline font data; when the media information elements are related to voice information, the main data includes data associated with a melody) and attribute data (for example, when the media information elements are related to character information, the attribute data includes character colors and sizes; when the media information elements are related to voice information, the attribute data includes pitches and reproduction speeds of voices). When a media information is desired to be changed, the user need only vary attribute data related thereto in many cases.

According to the present invention, the object above can be achieved, for example, as follows when the user copies a media information item from a source screen layout onto a destination screen layout so as to modify a portion of the element. Namely, before the user completely changes the portion, data corresponding thereto is not copied in the storage of the system.

Furthermore, the object above can be achieved as follows, for example, in a case where the user alters, after copying a media information element from a screen layout to another screen layout, a portion of the media information element of either one of the screen layouts, after a media information element is copied from a screen layout to another screen layout. Namely, it is only necessary that after the attribute data of the element is copied in the storage of the system, the attribute data is modified.

According to a desirable mode of embodying the present invention, in response to occurrence of necessity of modification of attribute data, a media information element or attribute data associated therewith is copied. Consequently, information elements can be operated in an independent fashion on the respective screen layouts without unnecessarily consuming the storage capacity of the storage of the system.

In accordance with another favorable mode of embodying the present invention, attribute data of a desired media information element is copied in association with screen layouts related thereto, the main data is commonly used for all screen layouts, and attribute data thus copied is utilized for each related screen layout. In consequence, information elements can be processed in an independent fashion on the respective screen layouts without unnecessarily consuming the storage capacity of the storage of the system.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Figure 1:
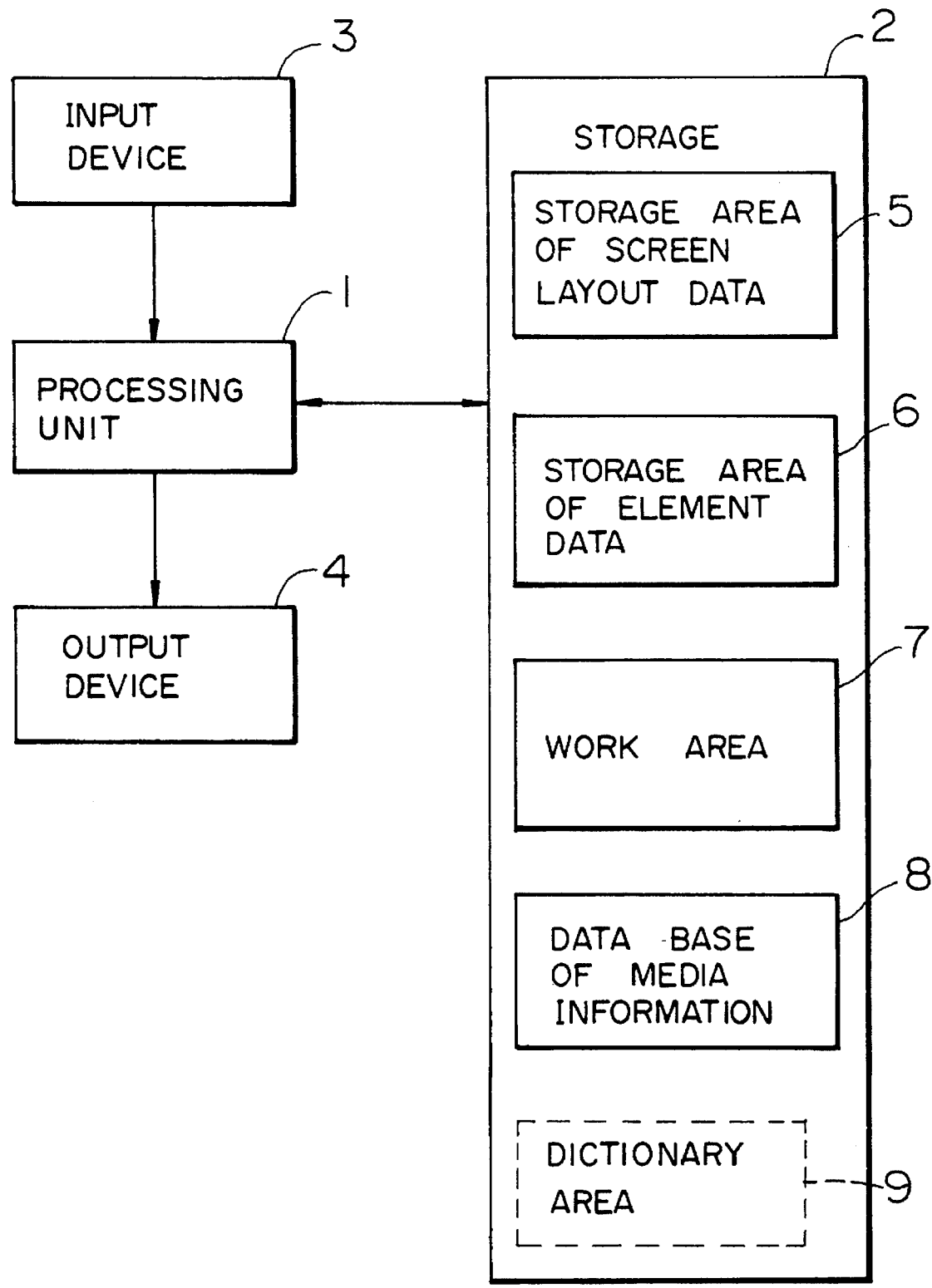
FIG. 1 is a diagram schematically showing the configuration of a multimedia system in an embodiment according to the present invention.

FIG. 1 shows the structure of the multimedia system in an embodiment according to the present invention. The constitution of FIG. 1 includes a processing unit 1, a storage 2, an input device 3, and an output device 4. In the storage 2, there are disposed an area 5 for storing therein screen layout data, an area 6 for storing therein element data of media information, a work area 7, and an area 8 of a media information data base for storing therein various kinds of media information and data. Details about these areas will be described later in conjunction with the operation of the embodiment. The storage 2 may be either the main storage (RAM), or any other external storage device such as a hard disk drive, an opto-electro-magnetic device or the like. The input device 3 is a keyboard, a mouse, or the like for the user to supply data and commands to the processing unit 1. The output device 4 is a display such as a graphic display outputting therefrom images and characters. Operations executed by the processor 1 will be described as operations of the embodiment in the following paragraphs.

Figure 2:
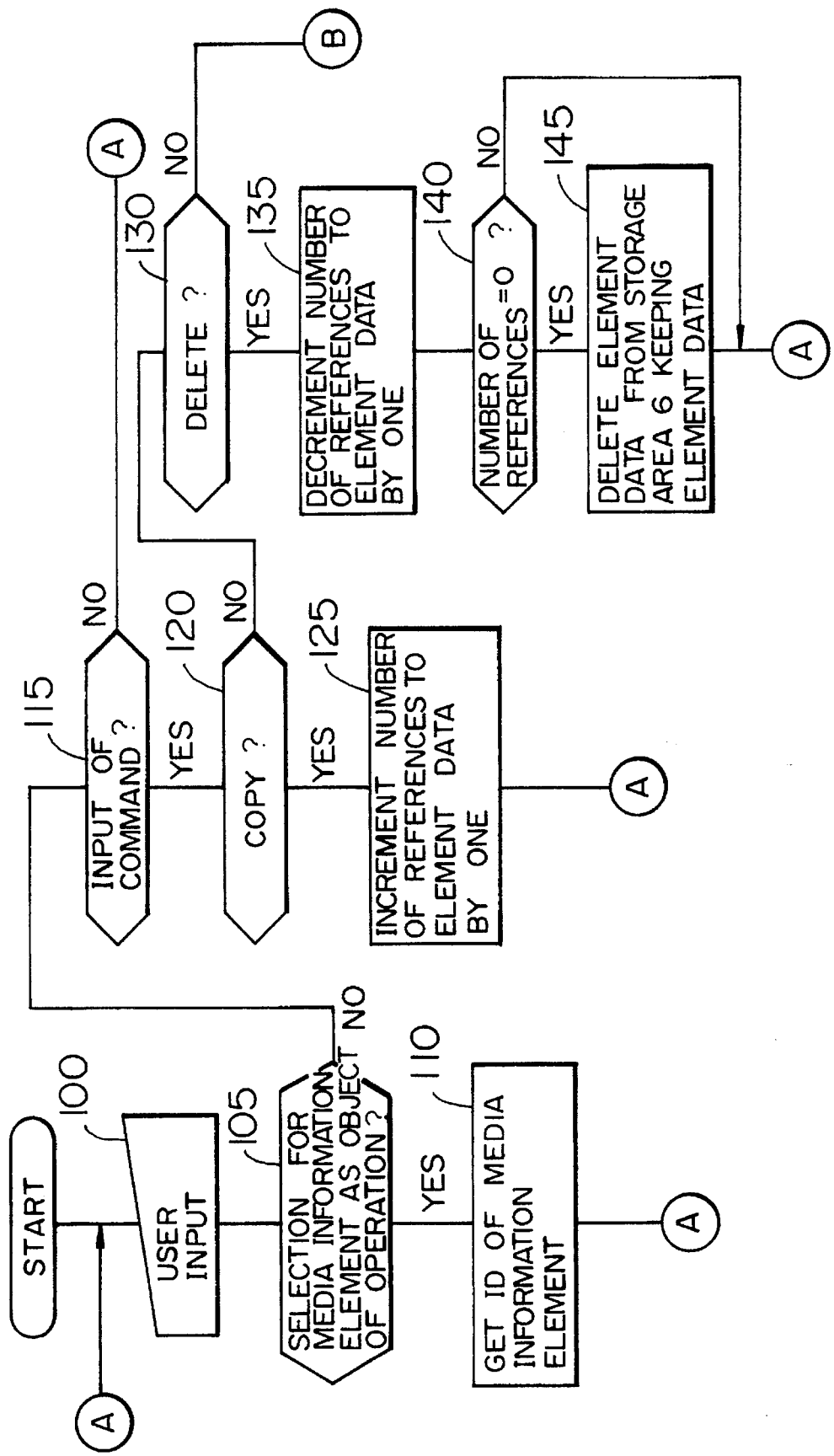
FIG. 2 is a portion of a flowchart showing the operation of the embodiment of FIG. 1.
Figure 3:
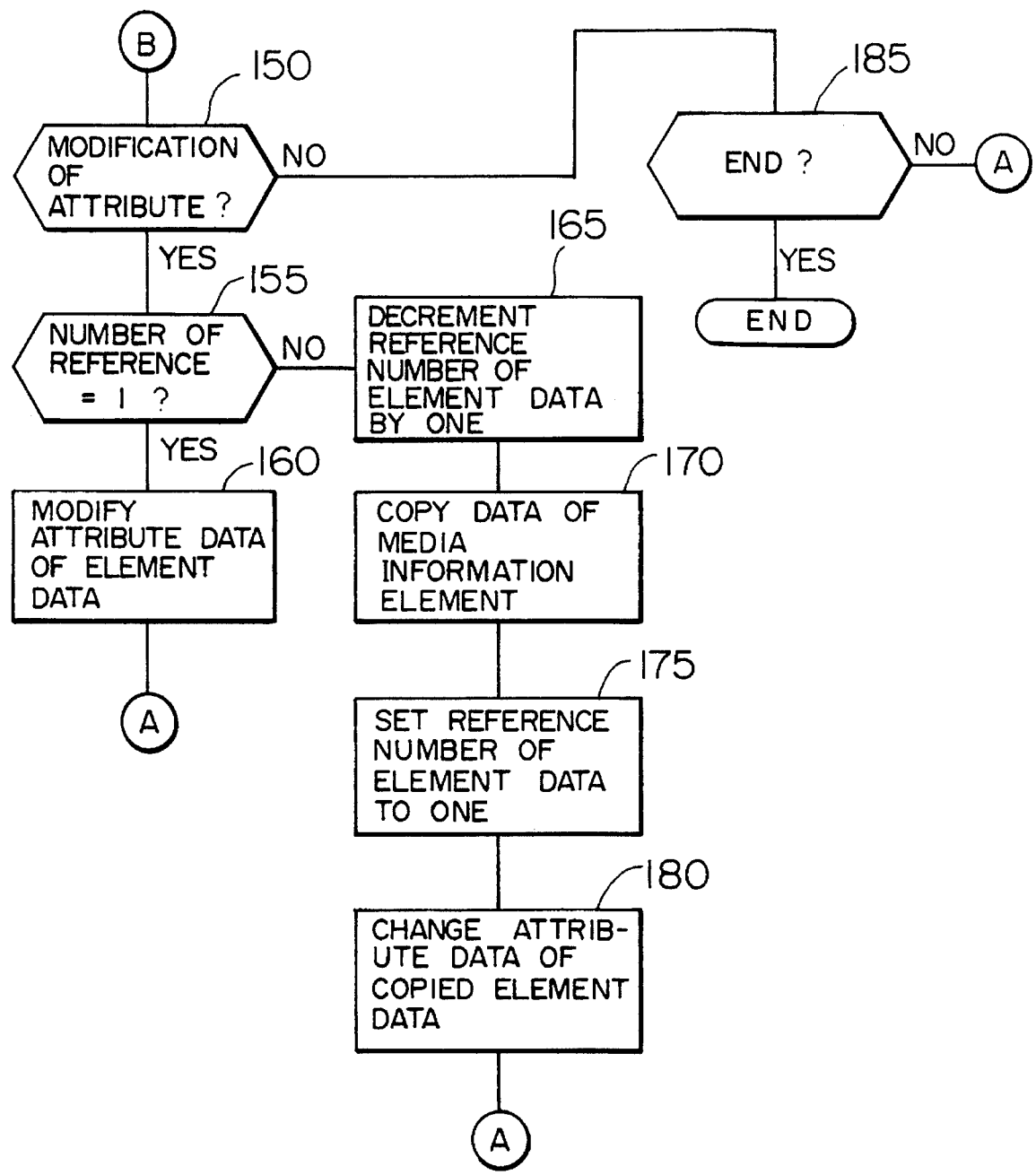
FIG. 3 is a portion of a flowchart showing the operation of the embodiment of FIG. 1.
Figure 4:
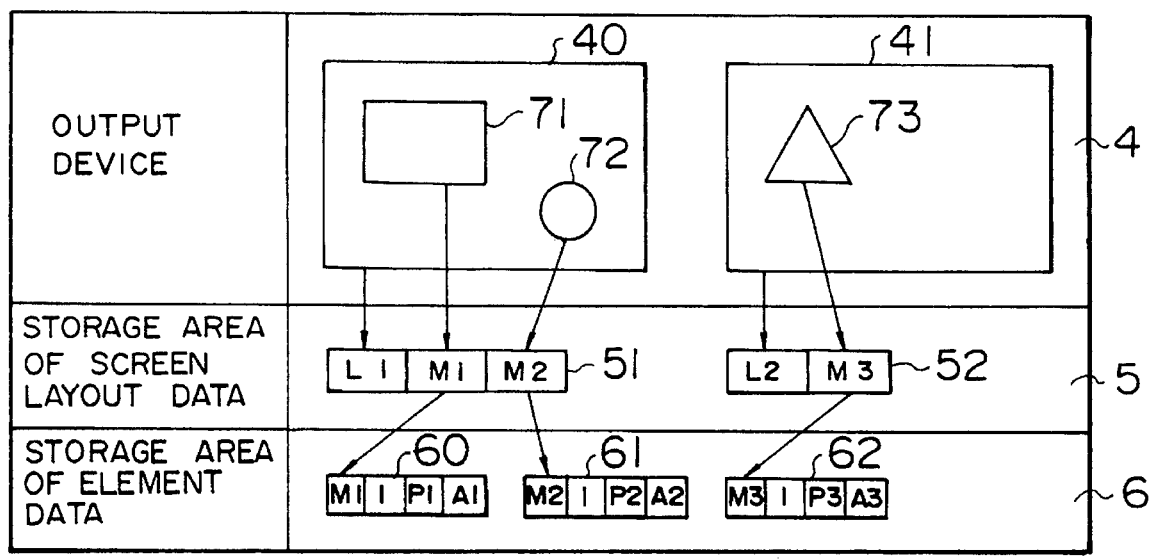
FIG. 4 is a diagram for explaining the copy operation of the embodiment of FIG. 1.
Figure 4:
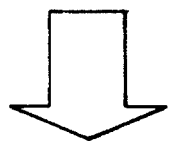
Figure 4:
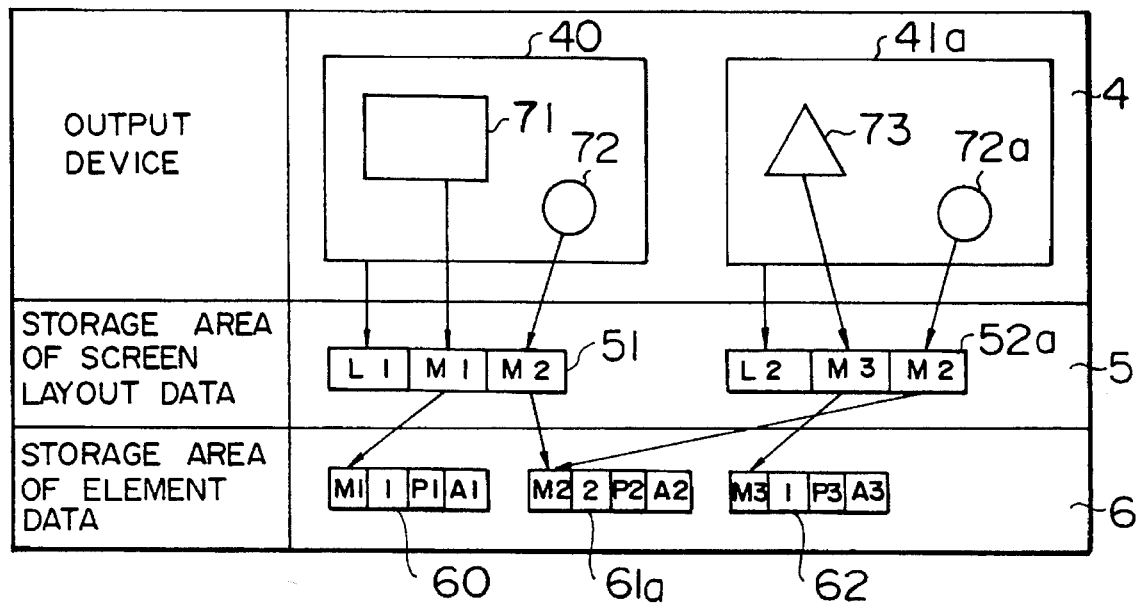
Figure 5:
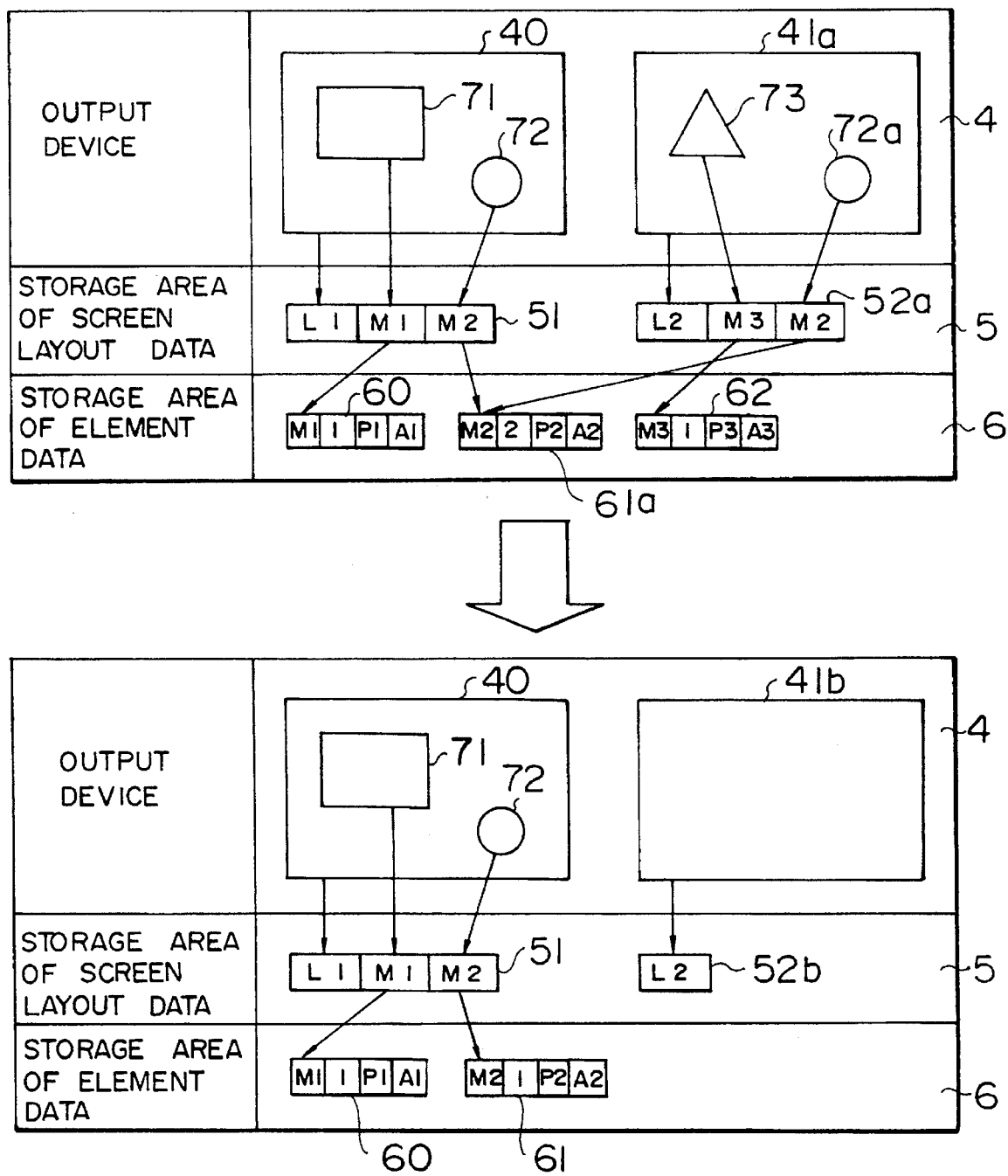
FIG. 5 is a diagram useful to explain the deleting operation of the embodiment of FIG. 1.
Figure 6:
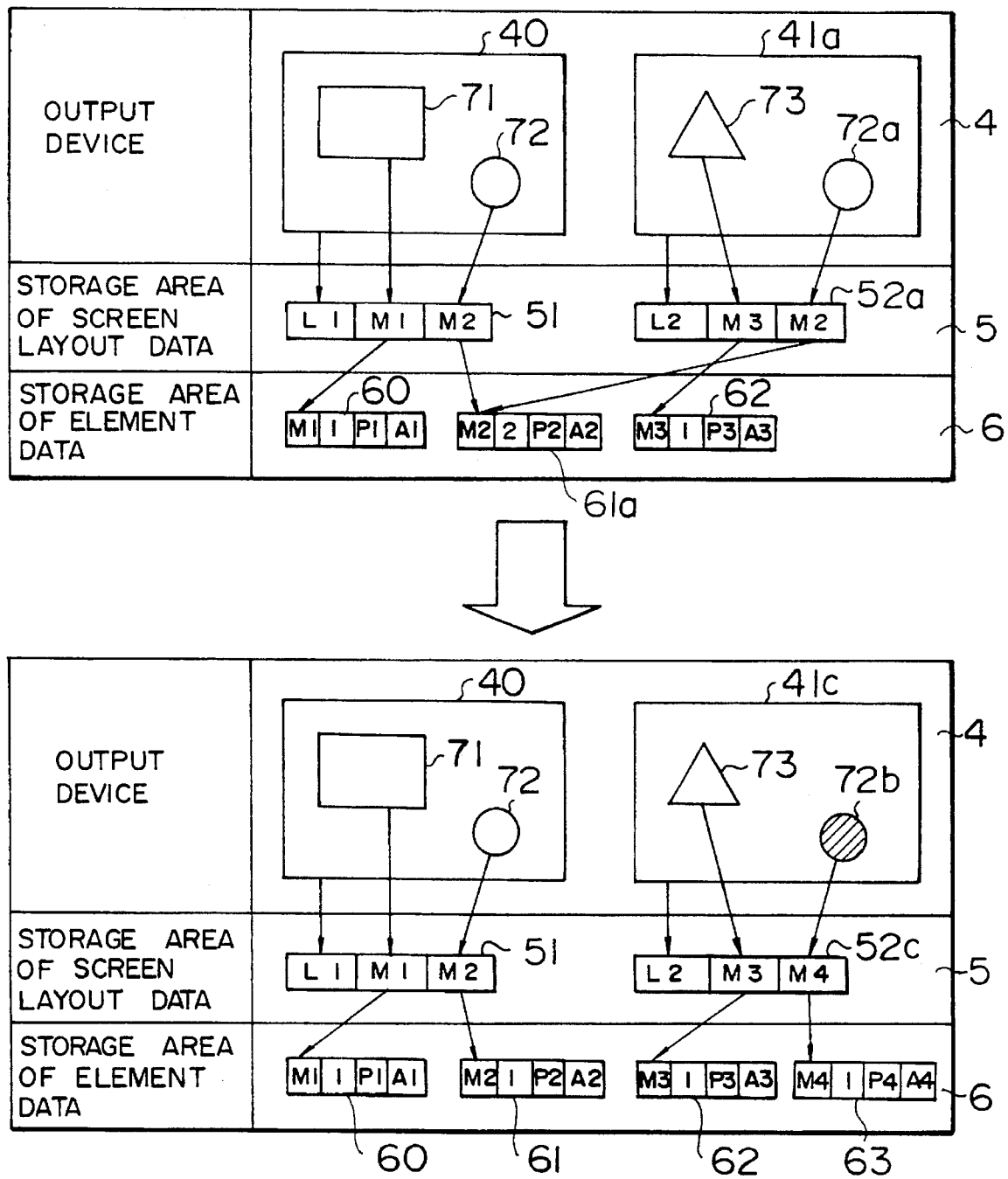
FIG. 6 is a diagram for explaining the operation of modifying attribute data in the embodiment of FIG. 1.

FIGS. 2 and 3 are flowcharts showing operations achieved by the embodiment configured as shown in FIG. 1. FIGS. 4 to 6 are diagrams for explaining the operations of the embodiment and show display states of the output device 4 and the state changes respectively of the data storage areas 5 and 6. Referring to these diagrams, the operations of the embodiment will be described according to the flowcharts of FIGS. 2 and 3.

In FIG. 2, on receiving a user input from the input device 3 (step 100), it is determined whether or not the contents of the input denote a selection for a media information element as an object of operation (step 105). If this is the case, there is acquired an identifier (ID) of the media information element thus selected (step 110) and then control is returned to the step 100.

In a system called a multimedia system, a plurality of screen layouts are sequentially displayed on a display screen according to lapse of time. In the multi-window system, on the other hand, considering the display screen in accordance with the spatial concept with respect to time, a plurality of media information elements (such as a mobile picture, a graphic image, and a character string) are presented in a plurality of windows on the display screen. In the multi-window system, the screen layouts are associated with the respective windows.

Consequently, the media information element selected as an object of operation is either one of the media information elements displayed in the respective screen layouts when the display screens are handled according to the lapse of time and in the respective windows when the screens are treated according to the spatial concept. Specifically, a media information element is a graphic image such as a circle or a rectangle, each picture element of a moving picture (such as a moving picture composed with mobile pictures of a background and an object or a moving picture developed by combining a moving picture of an inputted natural image with a mobile picture obtained from a computer graphics technology), or a processing unit such as a character string (for example, a storage unit of information, which is written or read by a command from or in a storage or a display unit, of information to be displayed by a command on a display).

The media information elements as objects of operation above are respectively assigned with identifiers for identification thereof and are stored in the storage 2. In consequence, in the step 110 of FIG. 2, according to the selection input for a media information element as an object of operation, an identifier representing the element is stored in the work area 7. It is possible that a plurality of media information elements are successively inputted, so that all of them may be subjected to the same operation by a command described hereinafter.

When the judgement of the step 105 of FIG. 2 indicates that the input is not for the selection of the media information element of the object of operation, it is checked to determine whether or not the contents of the input obtained in the step 100 designate an operation command for a media information element as an object (step 115). When the operation command is "copy" (step 120), the number of references to the media information element of which the identifier is stored in the work area 7 is incremented by one (step 125) and then the processing is transferred to the step 100. The copy operation will now be described in detail by referring to FIG. 4.

In the diagram of FIG. 4, there is shown a state transition, in response to a command supplied from the user to request a copy operation, from a state represented in an upper-half portion to a state displayed in a lower-half portion. Each portion includes a display state of the output device 4 as well as the states of the areas 5 and 6 for storing screen layout information and media information, respectively.

On the output device 4, there are presented a screen layout 40 and another screen layout 41. The screen layout 40 includes a rectangle 71 and a circle 72 as elements of media information; whereas, the screen layout 41 contains a triangle 73 as a media information element.

In the storage area 5, there are stored screen layout data 51 including an identifier L1 of the screen layout 40, an identifier M1 of a media information element for the rectangle 71, and an identifier M2 of a media information element for the circle 72 and screen layout data 52 constituted of an identifier of the screen layout 41 and an identifier M3 of a media information element for the triangle 73.

In the storage area 6, there are stored data items related to the respective media information elements. Specifically, there are stored for the rectangle 71 data items of media information elements including an identifier M1 of a media information element thereof, a reference number. (one in this state) associated with the screen layouts where the rectangle 71 is referenced, main data P1 of the media information element, and attribute data A1. As for the reference number, when a media information element having an identical identifier thereof, identical main data, and identical attribute data are employed in a plurality of screen layouts, in order to minimize the storage capacity of the storage 2, data of the media information element is shared between the plural screen layouts. The number of these layouts is set as the reference number. In a case where, for example, the media information element is a graphic image developed in a bit map, the data of the bit map is set as the main data, whereas a display position, a display color, a brightness for the display, etc. are represented as attribute data. For example, when the media information element includes letters and characters, codes thereof are denoted as the main data and the size of the letters as well as a display position, a display color, a brightness for the display, etc. are represented as attribute data.

In FIG. 4, like the data 60, there are stored data 61 of media information elements including an identifier M2 of an element for the circle 72, a reference number ("1"), main data P2, and attribute data A2 and data 62 including an identifier M3 of an element for the triangle 73, a reference number ("1"), main data P3, and attribute data A3.

In the situation above, when a copy command is inputted from the user to copy the circle 72 onto the screen layout 41, the state of the upper-half portion is changed into that shown in the lower-half portion. The media information element, the source screen layout, and the destination screen layout receiving the element from the source layout are specified by the user from an input device, for example, a mouse. Otherwise, a user gives names to the media information elements displayed on a screen layout, and then registers the names in a dictionary area 9 (as shown by dotted line in FIG. 1) in the storage 2. When the user is editing another screen layout, the user can call a desired media information element on the current screen layout from the dictionary area 9 by inputting or selecting the name thereof.

First, the identifier M2 of the element for the circle 72 is added to the screen layout data 52 and then the resultant data 52 is stored in the storage area 5. Moreover, the reference number of the element data 61 related to the identifier M2 is incremented by one (namely, the resultant value is two). The obtained data 61a is stored in the area 6. The processing unit 1 then draws a circle 72a on the screen layout 41Za according to the main data P2 and the attribute data A2 of the element data 61a.

Since the feature of the copy operation according to the present invention resides substantially in that only the reference number of the element data of the media information corresponding to the graphic image to be copied is incremented, the copy processing of main and attribute data can be dispensed with. This hence reduces the execution time of the copy operation and renders unnecessary the copy destination areas for the main and attribute data items, thereby minimizing the storage capacity of the storage 2.

Returning to FIG. 2, description will be given of an operation to be accomplished when the operation command is indicated as "Delete" (step 130). In response to a "Delete" command, for a media information element of which the identifier is stored in the work area 7, the reference number of data thereof is decremented (by one in a step 135). If the resultant value is "0" (step 145), the data of the pertinent element is deleted from the storage area 6 (step 145) and then control is passed to the step 100.

The deleting operation will be next described in detail by reference to FIG. 5. This diagram shows a state transition from the upper-half state to the lower-half state. In each half portion, there are shown a display state of the output unit 4 and the states respectively of the storage areas 5 and 6. In FIG. 5, since the display state of the output unit 4 and the presentation of storage states respectively of the areas 5 and 6 are almost the same as those of FIG. 4, a redundant explanation will be avoided and only the operations associated with the deletion will be now described.

In a state shown in the upper-half section of FIG. 5, which is identical to that presented in the lower-half portion of FIG. 4, when a deleting command is inputted to delete the triangle 73 and the circle 72a being displayed in the screen layout 41a, a state transition takes place to the state of the lower-half portion of FIG. 5. Such items necessary for this operation as a source screen layout and a media information element are specified by the user from, for example, a mouse. First, for the element data 61a related to the circle 72a, the reference number ("2") is decremented by one and then the resultant value is stored as element data 61 in the storage area 6. The obtained reference number is not "0" which hence indicates that the element data is referenced by another screen layout and accordingly is kept remained in the area 6. Next, for the element data 62 of the triangle 73, the reference number ("1") is decremented by one. Since the resultant value is "0" the data 62 is deleted from the area 6. Moreover, the identifiers M3 and M2 respectively designating the triangle 73 and the circle 72 are deleted from the screen layout data 52a such that the obtained data 52b is stored in the area 5. The processor 1 clears, according to the element data in the area 6, the triangle 73 and the circle 72a having been presented on the display 4.

The deleting operation has the following feature. Namely, when the reference number equals zero for a media information element, the element is deleted; however, only the reference number of the data related to the element is decremented in an ordinary case. Consequently, the deletion processing of the main and attribute data items can be dispensed with and the execution time of the deletion is minimized.

Returning to FIG. 3, description will be given of the operation in a case of an operation command denoting "attribute change" (step 150). For data of a media information element of an operation object of which the identifier is stored in the work area 7, the reference number is checked (step 155). If the value is "1" attribute data of the element is altered (step 160). Otherwise, namely, the reference number is "2" or more, the reference number is decremented by one in a step 165 and then the data of the element is copied to obtain a copy thereof (step 170). For data thus copied, the reference number is set to one (step 175) and then the data is changed (step 180), thereby returning control to the step 100. Based on the resultant data, an updated screen layout is displayed on the output device 4 by the processing unit 1.

Details of the attribute change operation will now be described by reference to FIG. 6. This diagram shows a state transition in the attribute change operation from a state presented in the upper-half portion to a state displayed in the lower-half portion. Each portion includes a display state of the output unit 4 and the states respectively of the areas 5 and 6. Since the display state of the output device 4 and the storage states respectively of the areas 5 and 6 of this diagram are substantially identical to those of FIGS. 4 and 5, a duplicated explanation will be avoided and only the points related to the attribute change operation will be described.

Figure 10:
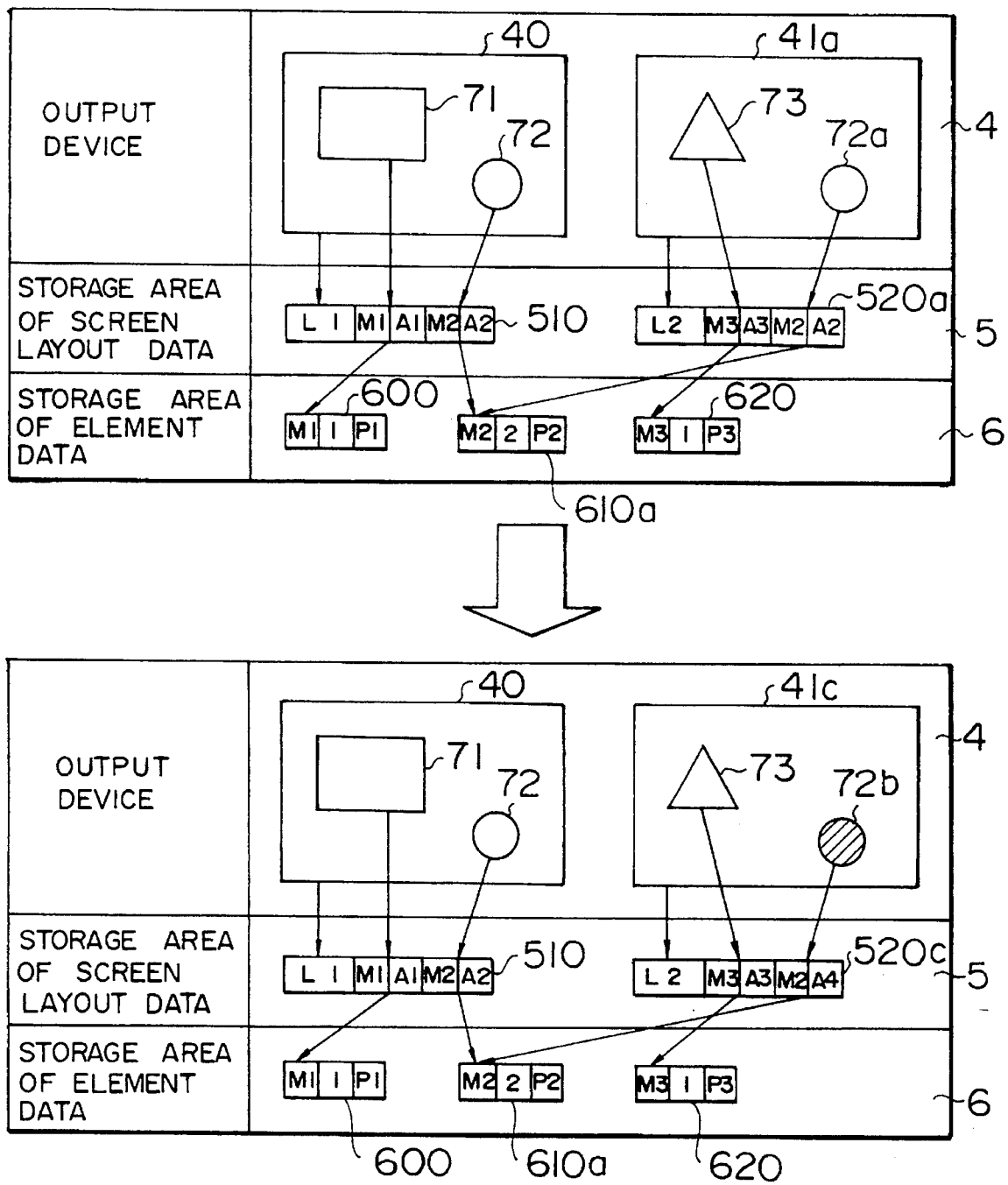
FIG. 10 is a diagram for explaining the operation of modifying attribute data in the embodiment of FIG. 7.

The diagram of the upper-half portion of FIG. 6 is the same as that of the lower-half portion of FIG. 4. In this state, when an attribute change command is inputted to alter a display state (namely, attributes such as a color and a brightness) of the circle 72a presented in the screen layout 41a, the display image is changed to that shown in the lower-half portion. Such items necessary for this operation as a source screen layout, a media information element, and an attribute thereof are specified by the user from, for example, a mouse. First, for the-element data 61a related to the circle 72a on the display 4, the reference number ("2") is checked. If the value is "1" attribute data A2 associated with the display state is modified according to information supplied together with the attribute change command. In the example of FIG. 6, since the reference number is "2" for the element 61a of the circle 72a, the number related to data of the element as the operation object is decremented by ("1" to obtain a resultant value "1"), thereby storing the value as element data 61 in the area 6. Subsequently, the element data 63 as the object of the attribute change is copied to create element data 61 to be stored in the area 6. For the copied data 63, the reference number is set to one and then the attribute data of the data 63 is changed from A2 to A4. The attribute data A4 is altered according to information supplied from the user in association with the attribute change command. Based on the element data 63 of which the attribute has been thus changed, the media information element 72b is displayed in the screen layout 41c by the processor 1. The attribute change is accomplished to change, for example, an output color. In FIG. 10, the result of the attribute change is indicated by a hatched image of the circle 72b.

According to a feature of the attribute change operation, when the reference number is "1", only the attribute data of the associated element data is changed, which consequently enables the attribute change processing to be executed at a high speed. When the reference number is "2" or more, the element data is first copied and then the attribute data is altered. In consequence, a large volume of data such as the main data need not be executed by the "Copy" command. Namely, the copy operation is first executed only in the stage of the attribute change processing. The storage capacity of the storage 2 is not consumed until such an attribute change processing is executed.

When the operation command is "End" (step 185), the processing is terminated.

Next, description will be given of the operation of an alternative embodiment according to the present invention. In this embodiment, the procedure of operation is in general substantially the same as that of the flowcharts shown in FIGS. 2 and 3. However, in the processing, the embodiment is different from that described in conjunction with FIGS. 4 to 6 in that the steps 155 to 180 of the flowchart of FIG. 3 are replaced with a step 190 of FIG. 7. Like in the case of the embodiment of FIGS. 4 to 6, the operations respectively of the copy, deletion, and attribute change will be described by reference to FIGS. 8 to 10. In this connection, the operations which can be implied in the foregoing explanation of the embodiment of FIGS. 4 to 6 will not be described.

Figure 8:
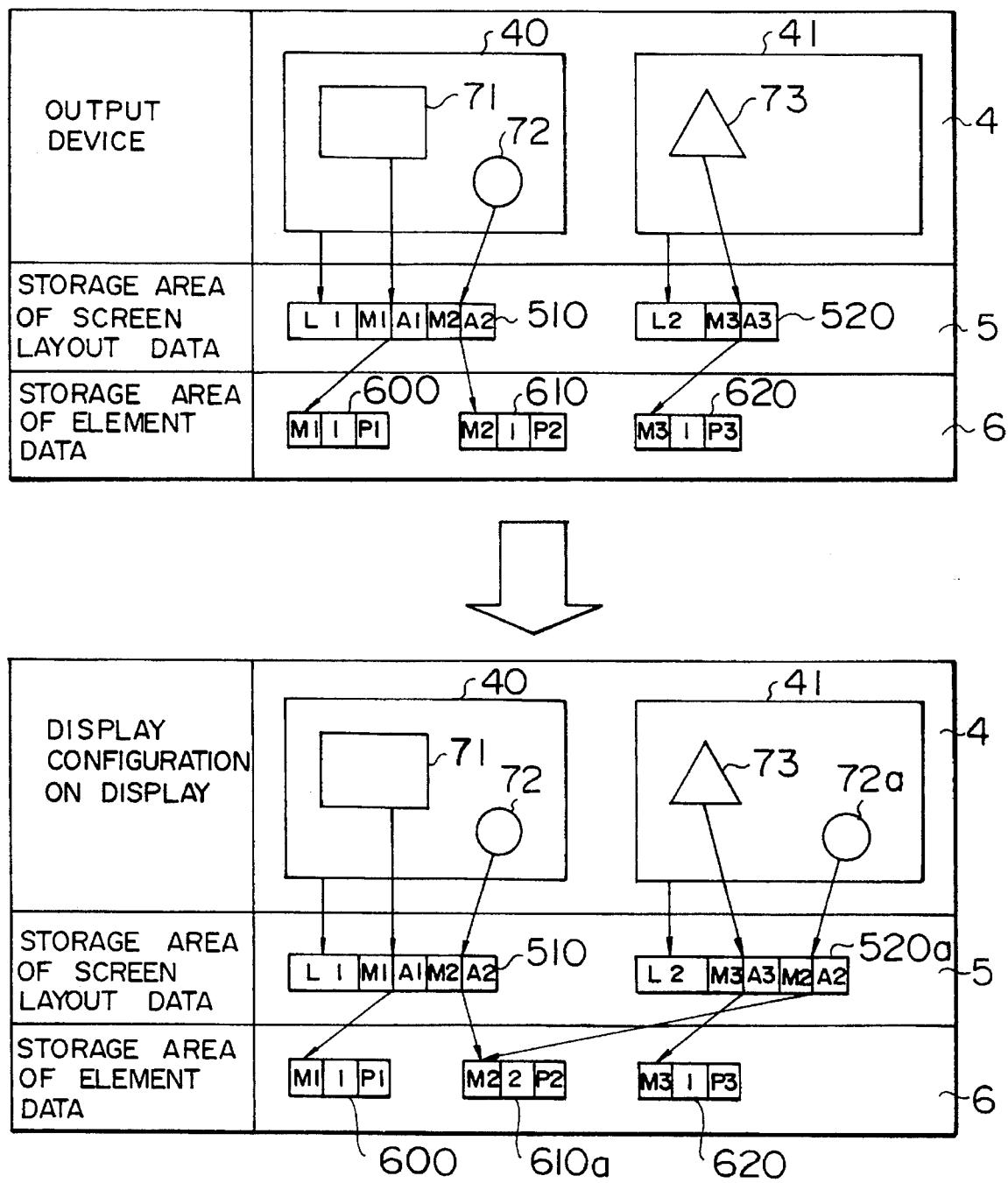
FIG. 8 is a diagram useful to explain the copy operation of the embodiment of FIG. 7.

FIG. 8 shows a state transition in the copy operation from a state of the upper-half portion to a state of the lower-half portion. Each portion includes a display state of the output device 4 and the states respectively of the storage areas 5 and 6. In this diagram, the constituent components as those of FIG. 4 are assigned with the same reference numerals.

In the area 5, there are stored screen layout data 51 constituting with an identifier L1 of the screen layout 40, an identifier M1 of a media information element for the rectangle 71, attribute data A1 of the rectangle 71, an identifier M2 of an element for the circle 72, and attribute data A2 of the circle 72 and screen layout data 520 including an identifier M3 of an element for the triangle 73 and attribute data A3 of the triangle 73.

In the area 6, there are stored data items related to the respective display images. Concretely, the area 6 includes element data 600 constituted with an identifier M1 of an element for the rectangle 71, a reference number of the rectangle 71, and main data P1 representing the rectangle 71.

Like the element data 600, there is stored element data 610 constituted with an identifier M2 of an element for the circle 72, a reference number of the circle 72, and main data P2 thereof and element data 620 including an identifier M3 of an element for the triangle 73, a reference number ("1") of the triangle 73, and main data P3 thereof.

As can be understood from the description above, in this embodiment as contrast with that of FIGS. 4 to 6 in which attribute data items of graphic images are treated as element data of media information, the attribute data items are treated as screen layout data.

In the state above, when a copy command is inputted to copy the circle 72 onto the screen layout 41, a state transition takes place to establish the state presented in the lower-half portion of FIG. 8. First, the identifier M2 of the element for the circle 72 and the attribute data A2 thereof are added to the screen layout data 520. The obtained data is stored as data 520a in the storage area 5. Moreover, one is added to the reference number of the element data 610 corresponding to the identifier M2 (the result is "2") such that the obtained data 610a in the storage area 6. The processor 1 draws, according to the main data P2 and the attribute data A2 of the element data 610a, a circle 72a in the screen layout 41. In this regard, to produce the attribute data A4 in the data 520a, the processing unit 1 copies, according to the identifier M2 of the data 610a, the associated attribute data A2 onto a sub-area M2 of the storage area 510.

According to the feature of the copy operation, there is substantially achieved the following operations. Namely, the reference number is incremented for the element data of media information related to the image to be copied and then the attribute data is copied. In consequence, the copy operation of the main data is unnecessitated and hence the copy command is executed in a short period of time. Moreover, the copy area of the main data is not required, which resultantly minimizes the storage capacity of the storage 2.

Figure 9:
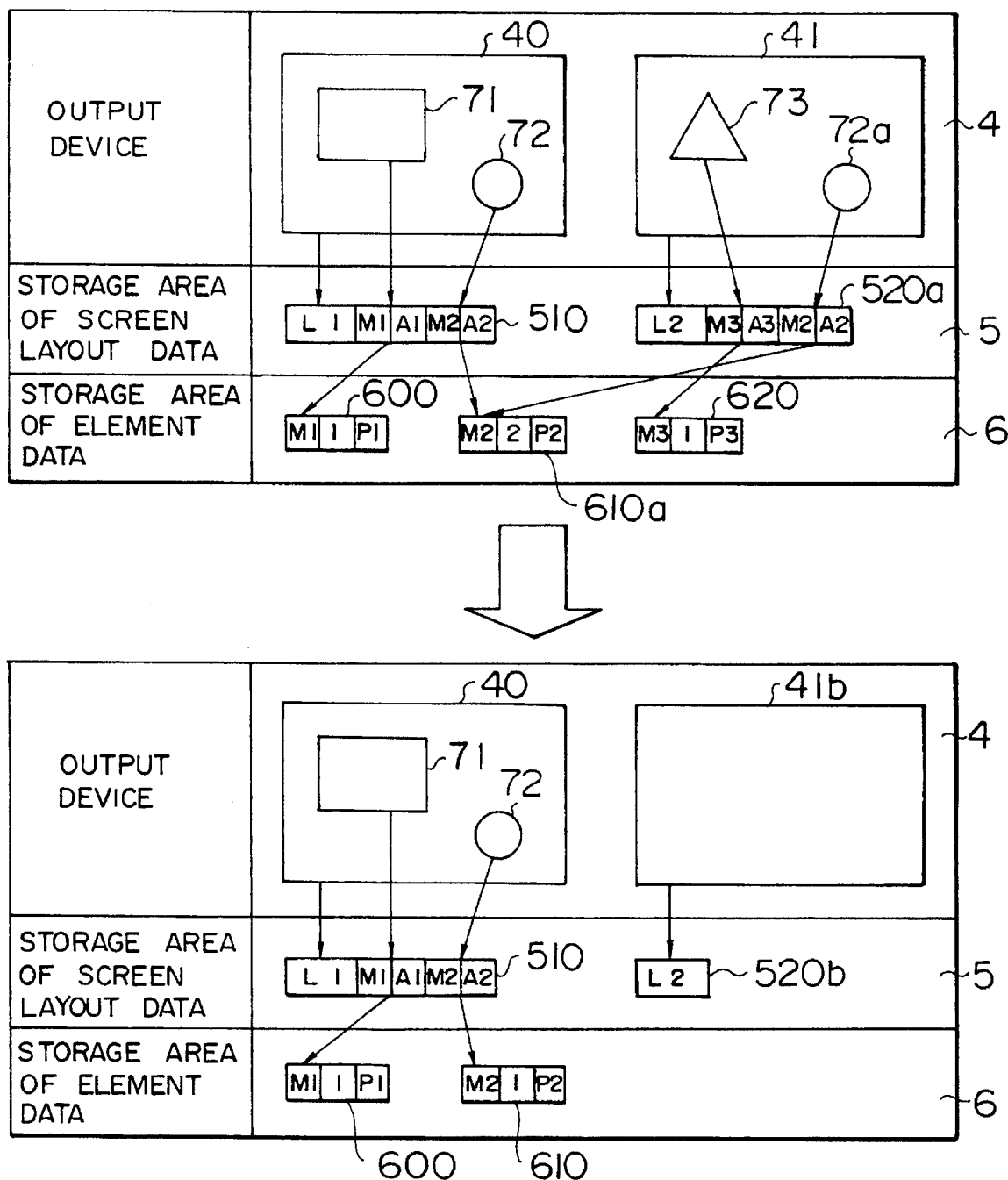
FIG. 9 is a diagram for explaining the deleting operation of the embodiment of FIG. 7.

Referring to FIG. 9, the deleting operation will be described in detail. In FIG. 9, since the display state of the output device 4 and the presentation states respectively of the storage areas 5 and 6 are almost the same as those of FIG. 8, a redundant description thereof will be avoided and only the operations associated with the deletion will be described.

In the state shown in the upper-half portion of FIG. 9, which is identical to that of the lower-portion of FIG. 8, when a deleting command is inputted to delete the triangle 73 and the circle 72a displayed in the screen layout 41a, a state transition occurs to develop the state of the lower-portion of FIG. 9. First, the reference number ("2") for the element data 610a of the circle 72a is decremented by one to store the resultant data as element data 610 in the storage area 6. Since the obtained reference number is not "0" ("1" in this case), the element data is assumed to be referenced from another screen layout and hence is kept remained in the area 6. Next, the reference number ("1") for the element data related to the triangle 73 is decremented by one. Since the resultant value is "0", the element data 620 is deleted from the storage area 6. Moreover, the identifiers M3 and M2 respectively denoting the triangle 73 and the circle 72a as well as attribute data items A4 and A2 respectively thereof are deleted from the screen layout data 520 to store the resultant data 520b in the storage area 5. Based on the element data items respectively stored in the areas 5 and 6, the processor 1 deletes the media information elements 73 and 72a in the screen layout 41.

The feature of the deleting operation is substantially identical to that of the embodiment described in conjunction with FIGS. 4 to 6.

Figure 7:
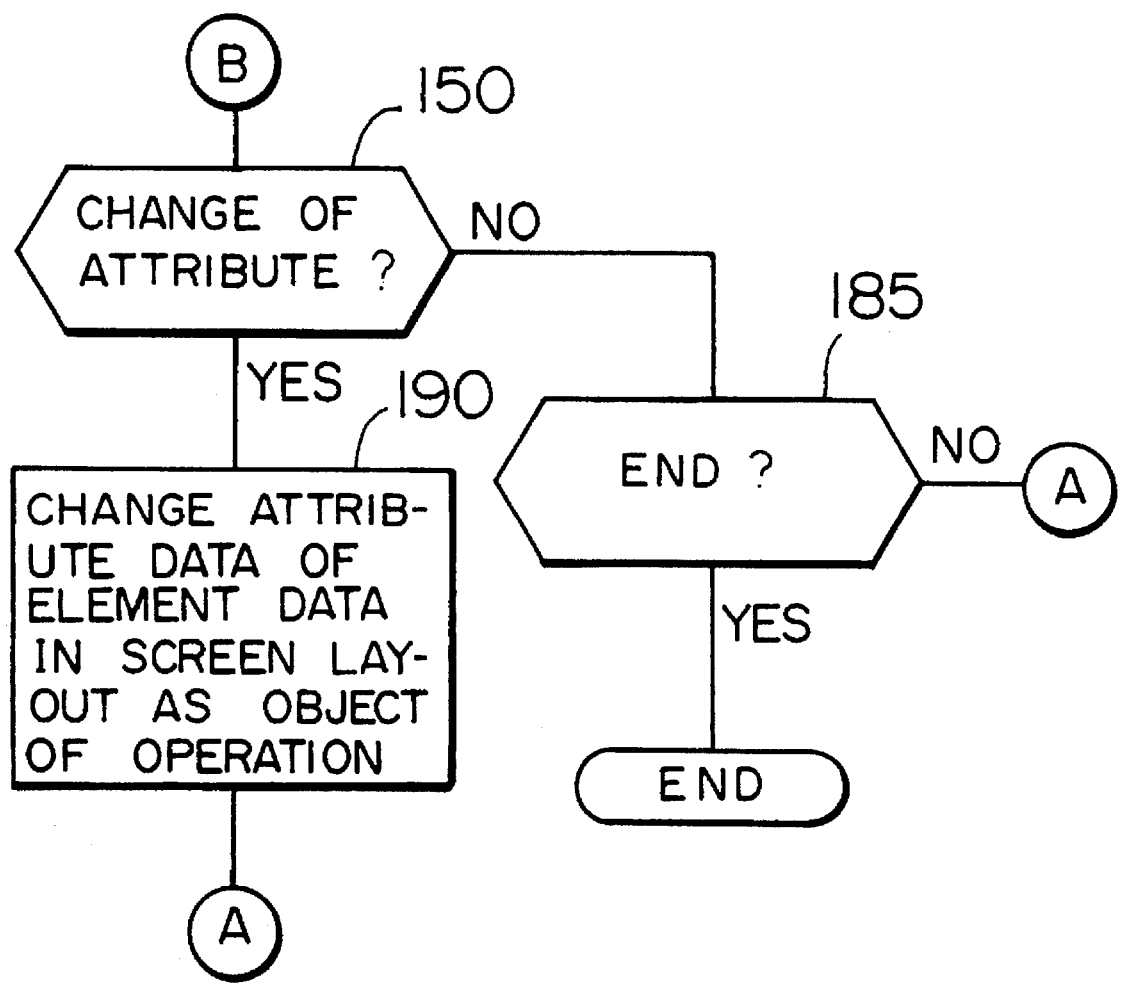
FIG. 7 is a portion of a flowchart showing the operation of an alternative embodiment according to the present invention.

When the operation command indicates "attribute change" (step 150 of FIG. 7), a step 190 is executed in FIG. 7. The attribute change operation of this step will be described in detail by reference to FIG. 10 showing a state transition from a state of the upper-half portion to a state of the lower-half portion due to an attribute change. Each portion includes a display state of the output device 4 and the states respectively of the storage areas 5 and 6. In FIG. 10, since the display state of the output device 4 and the presentation states respectively of the storage areas 5 and 6 are almost the same as those of FIGS. 8 and 9, a duplicated description thereof will be above and only the points related to the attribute change will now be described.

The upper-half portion of FIG. 10 is identical to the lower-half portion of FIG. 8. In this state, when an attribute change command is inputted to alter display states (namely, attributes such as a color and a brightness) of the circle 72a presented in the screen layout 41a, the display image is changed to the state of the lower-portion of FIG. 10. Attribute data for the circle 72a of the data 520a is changed from A2 to A4. The data A4 is varied according to information supplied from the user in association with the attribute change command. The attribute change is issued to change, for example, an output color, and such an example is indicated as a hatched portion of the circle 72b in FIG. 10.

The feature of the attribute change operation resides in, as compared with the embodiment of FIGS. 4 to 6, that a large amount of data such as main data is not copied and there is only conducted an alteration of attribute data, which hence much more minimizes the period required to execute the attribute change processing.

When the operation command is "End" (step 185), the processing is terminated.

Subsequently, description will be given of another alternative embodiment according to the present invention. The operation procedure of this embodiment substantially conforms to the flowcharts of FIGS. 2 and 3. However, in the processing, the present embodiment is different from that of FIGS. 4 to 6 in that the steps 150 to 180 of the flowchart 3 are replaced with steps 195 and 200 of FIG. 11. Like in the case of the embodiment of FIGS. 4 to 6, the operation of this embodiment will be described by reference to FIGS. 12 and 13. In this connection, the operations already involved in the description of the embodiment above will be avoided. The copy operation will be described by referring to FIG. 12; whereas the moving operation will be described in a different way, namely, as an example of the attribute change operation. Since the moving operation in this description can be regarded as a kind of the attribute change operation, the command to be inputted may be an "attribute change" command. Moreover, the moving operation can be applied to a change of a display position as well as to a change of any attribute item of attribute information other than the display position, for example, a display color.

Figure 12:
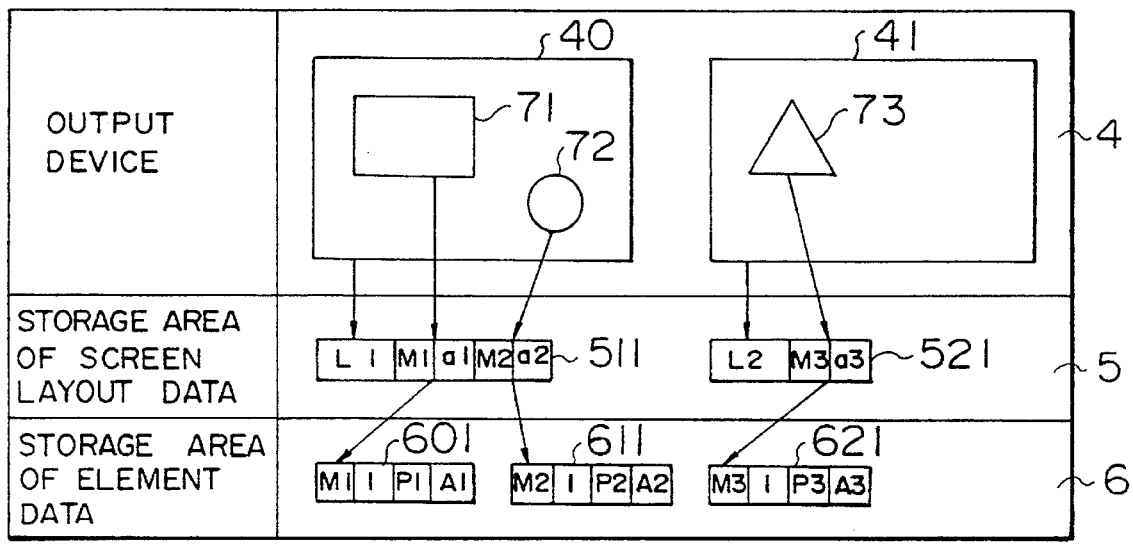
FIG. 12 is a diagram useful to explain the copy operation of the embodiment of FIG. 11.
Figure 12:
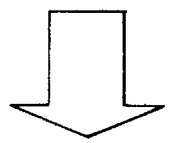
Figure 12:
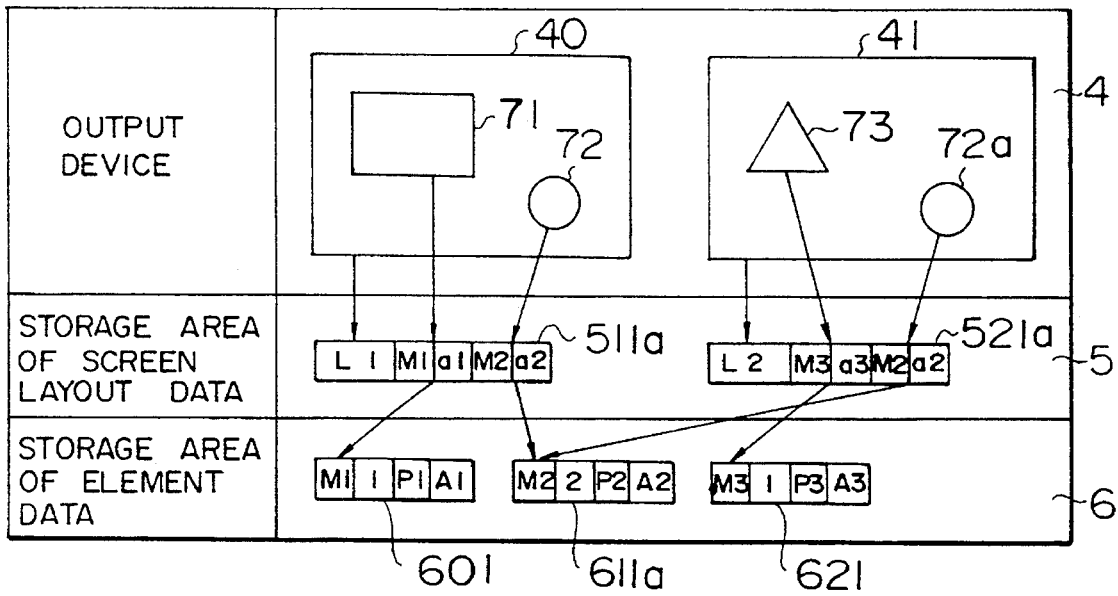

FIG. 12 shows a state transition occurred due to a copy operation from a state of the upper-half portion to a state of the lower-half portion. Each portion includes a display state of the output device 4 and the states respectively of the storage areas 5 and 6. In this diagram, the same constituent components as those of FIG. 4 are assigned with the same reference numerals.

In the storage area 5, there are stored screen layout data 511 and 521. The data 511 includes an identifier L1 of the screen layout 40, an identifier M1 of an element for the rectangle 71, display position data a1 as an attribute data item of the rectangle 71, an identifier M2 of an element for the circle 72, and display position data a2 as an attribute data item of the circle 72. The screen layout data 521 includes an identifier L2 of the screen layout 41, an identifier M3 of an element for the triangle 73 and display position data as an attribute data item of the triangle 73.

In the area 6, there are stored data items related to the respective display images. More concretely, for the rectangle, there is stored element data 601 including an identifier M1 of an element thereof, a reference number, main data P1 indicating the rectangle 71, and attribute data A1 constituted with attribute items other than the display position data a1 of the rectangle 71.

Like the element data 601, there are stored element data 611 for the circle 72 including an identifier M2 of an element thereof, a reference number, main data P2, and attribute data A2 constituted with attribute items other than the display position data a2 of the circle 72 and element data 621 for the triangle 73 including an identifier M3 of an element thereof, a reference number, main data P3, and attribute data A3 constituted with attribute items other than the display position data a3 of the triangle 73.

As can be understood from the description above, according to the feature of this embodiment, the attribute data of each graphic image is subdivided into element data of media information and screen layout data.

In the state above, when a copy command is inputted to copy the circle 72 onto the screen layout 41, the display state is changed into that shown in the lower-half portion of FIG. 12. First, the identifier M2 of the element for the circle 72 and the display position data a2 are added to the screen layout data 521 such that the obtained data 521a is stored in the area 5. Furthermore, one is added to the reference number (the result is "2") of the element data 611 associated with the identifier so as to store the resultant data 611a in the area 6.

According to the feature of the copy operation, it is substantially achieved that the reference number of the element data of a graphic image to be copied is incremented and only an attribute data item, namely, the display position data is copied. Namely, since only an attribute data item having a high frequency of attribute change is copied, the copy processing of the main data and other attribute data items is dispensed with. Accordingly, the copy processing can be accomplished in a short period of time. Moreover, since the copy area of main data is unnecessitated, the storage capacity of the storage 2 can be decreased.

Figure 11:
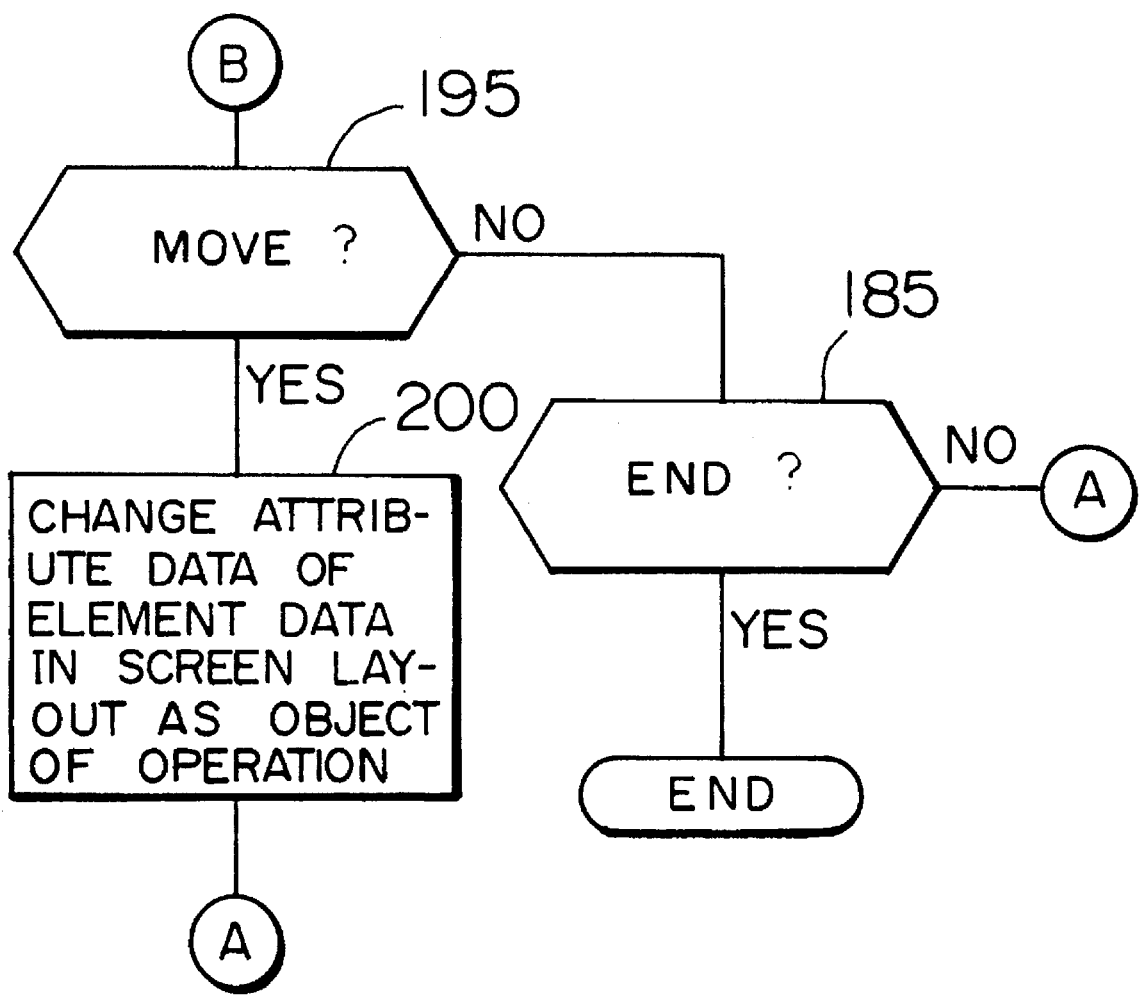
FIG. 11 is a portion of a flowchart showing the operation of further an alternative embodiment according to the present invention.
Figure 13:
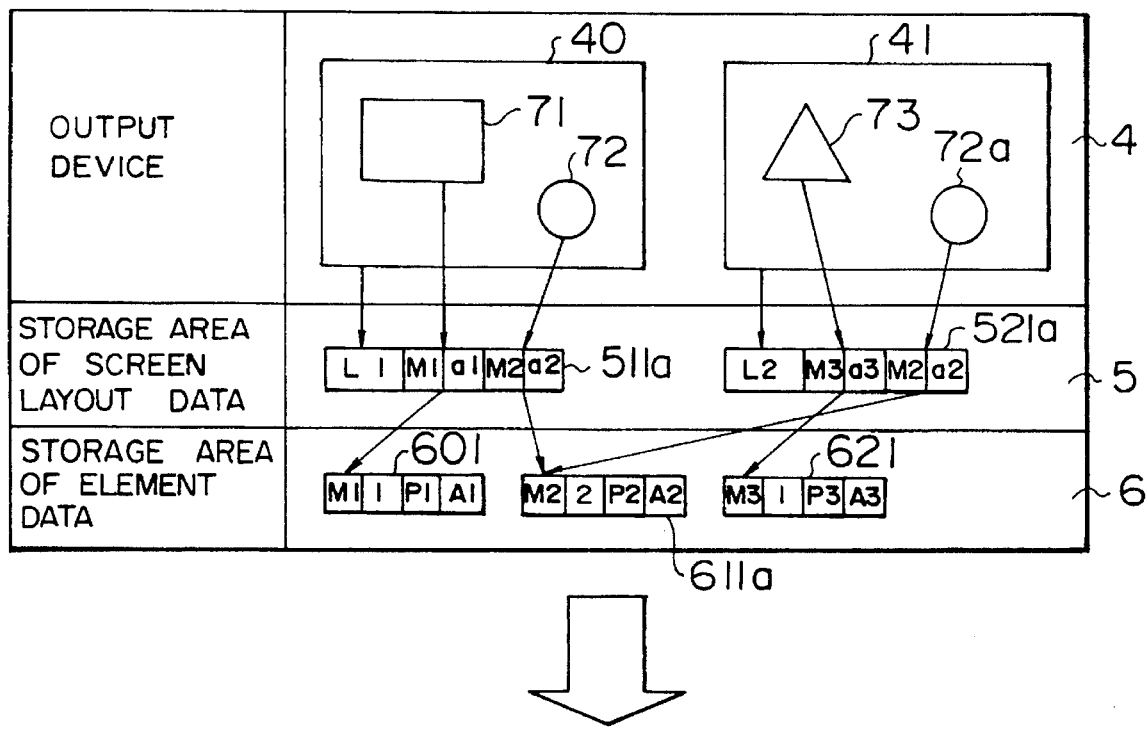
FIG. 13 is a diagram for explaining the moving operation of the embodiment of FIG. 11.
Figure 13:
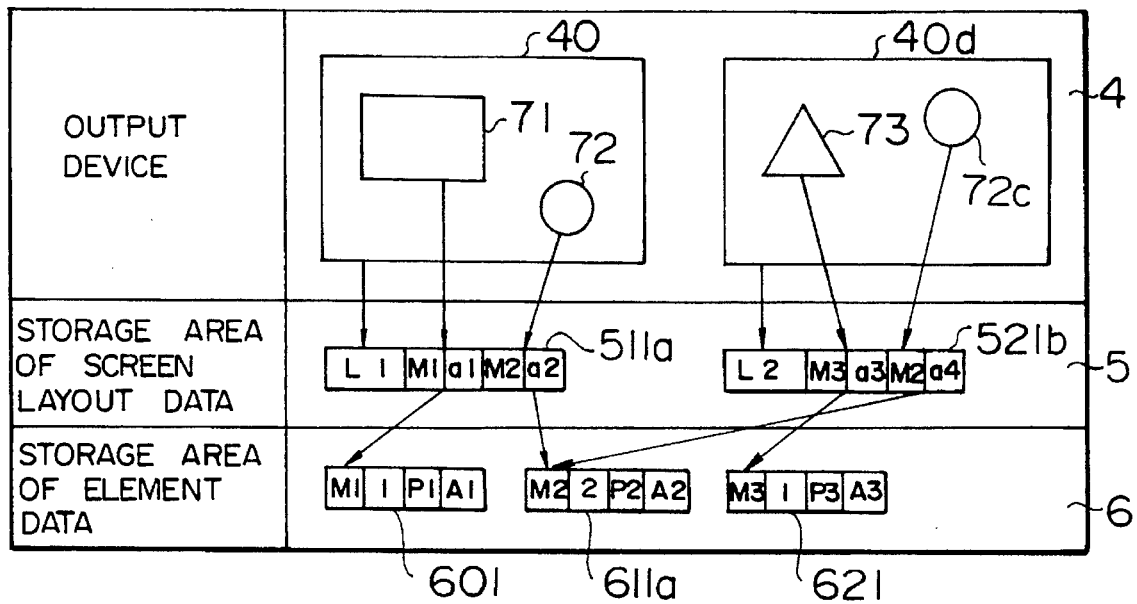

When the operation command indicates a "move" operation (step 195 of FIG. 11), the processing unit 1 executes a step 200 of FIG. 11. Details of the move operation of the step 200 will now be described by reference to FIG. 13 showing a state transition from the upper-half portion to the lower-half portion in response to a move operation. In each portion, there are shown a display state of the output device 4 and the states respectively of the storage areas 5 and 6. In FIG. 13, the display state of the output device 4 and the methods of displaying the storage states respectively of the areas 5 and 6 are the same as those of FIG. 12. Consequently, a redundant description thereof will be avoided and only the operations related to the move processing will be described.

The state of the upper-half portion of FIG. 13 is identical to that of the lower-half portion of FIG. 12. In this state, when a move command is inputted to alter the display position of the circle 72a presented in the screen layout 41a, the display state is varied to that shown in the lower-half portion of FIG. 13 the display position data a2 for the circle 72a of the data 521a is altered to data a4. The data a4 is changed according to information (a new display position) supplied in relation to the move command.

According to the feature of the move operation, since only the display position data is varied in the attribute data, the period of time required to execute the attribute change can be minimized.

As already described above, in place of the display position data, an attribute such as a display color may be separately treated. That is, data items possibly having a high frequency of attribute change are selected for the processing from the attribute data of a shared graphic image. This leads to the technological feature of the embodiment that the processing of attribute change is simplified without increasing the storage capacity of the storage.

When the operation command denotes an "End" operation (step 185), the processing is terminated.

As can be appreciated from the description of the embodiments above, the present invention can be employed to construct a system in which the screen layouts 40 and 41a are displayed on the output device as mutually different screens with respect to time. In addition, the present invention is also applicable to a multi-window system using the screen layouts 40 and 41a as windows wherein the screen operation is achieved with the windows of which the respective display states are altered with respect to time. In either case, without consuming an unnecessary storage capacity, elements of media information can be operated in a mutually independent manner in the associated screen layouts.

While particular embodiments of the invention have been shown and described, it will be obvious to those skilled in the art that various changes and modifications may be made without departing from the present invention in its broader aspects.

We claim:

1. A method of controlling information in a multimedia system including a processing unit, a storage, a display, and an input device, the system executing the steps of:

storing, in a first area of said storage, for each of a plurality of screen layout areas simultaneously used by the processing unit, screen layout data including an identifier of each of a plurality. Of media information elements used in the screen layout area;

storing element data of said media information elements used in the plural screen layout areas in a second area of said storage, said element data being constituted with data representing a media information element and a reference number denoting a number of screen layout areas referencing the media information element corresponding to said each element data;

adding in the first area of said storage, in response to a command requesting a copy of a media information element inputted via the input device, an identifier of the media information element to be copied to screen layout data associated with a destination screen layout area, and incrementing, in the second area of said storage, a reference number of the element data corresponding to the media information to be copied;

in response to a command inputted via the input device to change one of same media information elements simultaneously used, copying element data associated with a media information element to be changed in the second area of said storage so as to use copied element data as element data of the media information element to be changed;

decrementing, in the second area of said storage, a reference number in element data associated with a media information element as a change source;

changing, in the first area of said storage, an identifier of the media information element to be changed in a screen layout data associated with a screen layout as an object of change to have a new identifier;

initializing, in the second area of said storage, a reference number as "one" in element data associated with the media information element as the change object;

changing the media information as the change object; and presenting, for each of the plural screen layout areas, the media information elements related thereto according to data stored in the storage.

2. A method according to claim 1, wherein in response to a command inputted via the input device to delete one of same media information elements simultaneously used, the processing unit deletes in the first area of said storage an identifier of a media information element as an object of deletion and said at least a portion of attribute data thereof from screen layout data associated with a screen layout area as an object of deletion and decrements in the second area of said storage, a reference number in element data associated with the media information element as the deletion object.

3. A method according to claim 1, wherein the processing unit changes in the first area of said storage, in response to a command inputted via the input device to change one of same media information elements simultaneously used, at least a portion of attribute data of the media information element as a change object in screen layout data of the change object.

4. A method according to claim 3, wherein said at least a portion of attributed data includes data indicating a position in a screen layout area of a media information element associated with the attribute data.

5. A method according to claim 1, wherein a media information element is a portion of information of either one of a character string, a graphic image, a video image, a moving picture, a music piece, and a voice.

6. A method according to claim 5, wherein:

a media information element is a portion of information of a character string; and said at least a portion of attribute data is a size of characters.

7. A method according to claim 5, wherein:

a media information element is a portion of a music piece; and said at least a portion of attribute data is a pitch of tone.

8. A method according to claim 1, wherein a selected number of the plural screen layout areas are displayed on a display screen of the display at a same time.

9. A method according to claim 1, wherein all the plural screen layout areas are displayed on a display screen of the display at a same time.

10. A method of controlling information in a multimedia system including a processing unit, a storage, a display, and an input device, the system executing the steps:

storing, in a first area of said storage, for each of a plurality of screen layout areas simultaneously used by the processing unit, screen layout data including an identifier of each of a plurality of media information elements used in the screen layout area and at least a portion of attribute data representing the media information element;

storing element data of said media information elements used in the plural screen layout areas in a second area of said storage, said element data including remaining data representing media information element and data indicating a reference number denoting a number of screen layout areas referencing the media information element corresponding to said each element data;

copying, in the first area of said storage, in response to a command inputted via the input device to request a copy of a media information element, an identifier of a media information element as an object of copy and said at least a portion of attribute data of the media information element as an object of copy onto screen layout data associated with a screen layout area as a destination of copy, and incrementing, in the second area of said storage, a reference number of element data associated with the media information element as the copy object; and presenting, for the plural screen layout areas, the media information elements according to data stored in the storage.

11. A method according to claim 10, wherein in response to a command inputted via the input device to delete one of same media information elements simultaneously used, the processing unit deletes in the first area of said storage an identifier of a media information element as an object of deletion and said at least a portion of attribute data thereof from screen layout data associated with a screen layout area as an object of deletion and decrements in the second area of said storage, a reference number in element data associated with the media information element as the deletion object.

12. A method according to claim 10, wherein the processing unit changes in the first area of said storage, in response to a command inputted via the input device to change one of same media information elements simultaneously used, at least a portion of attribute data of the media information element as a change object in screen layout data of the change object.

13. A method according to claim 12, wherein said at least a portion of attributed data includes data indicating a position in a screen layout area of a media information element associated with the attribute data.

14. A method according to claim 10, wherein a media information element is a portion of information of either one of a character string, a graphic image, a video image, a moving picture, a music piece, and a voice.

15. A method according to claim 14, wherein:
a media information element is a portion of information of a character string; and
said at least a portion of attribute data is a size of characters.

16. A method according to claim 14, wherein:
a media information element is a portion of a music piece; and
said at least a portion of attribute data is a pitch of tone.

17. A method according to claim 10, wherein a selected number of the plural screen layout areas are displayed on a display screen of the display at a same time.

18. A method according to claim 10, wherein all the plural screen layout areas are displayed on a display screen of the display at same time.

19. A multimedia system comprising:
a display for displaying thereon a plurality of screen layout areas;

an input device for inputting a command indicating operations of the plural screen layout areas;

a storage for storing, in a first area, for each of the plural display layout areas to be displayed by the display, screen layout data including an identifier of each of a plurality of media information elements used in each screen layout area and at least a portion of attribute data of each of the media information elements used in each screen layout area, and storing in a second area, element data of said media information elements used by the plural screen layout areas, said element data including, remaining data representing a media information element and a reference number denoting a number of screen layout areas referencing the media information element corresponding to said each element data; and a processing unit for copying in the first area of said storage, in response to a command inputted via the input device to request a copy of a media information element, an identifier of a media information element as an object of copy and said at least a portion of attribute data of the media information element as an object of copy onto screen layout data associated with a screen layout area of a destination of copy, and incrementing, in the second area of said storage, a reference number of element data associated with the media information element as the copy object, the processing unit presenting, for the plural screen layout areas, the media information elements according to data stored in the storage.

20. A system according to claim 19, wherein in response to a command inputted via the input device to delete one of same media information elements simultaneously used, the processing unit deletes in the first area of said storage an identifier of a media information element as an object of deletion and said at least a portion of attribute data thereof from screen layout data associated with a screen layout area as an object of deletion, and decrements in the second area of said storage a reference number in element data associated with the media information element as the deletion object.

21. A system according to claim 19, wherein the processing unit changes in the first area of said storage, in response to a command inputted via the input device to change one of same media information elements simultaneously used, at least a portion of attribute data of the media information element as a change object in screen layout data of the change object.

22. A system according to claim 21, wherein said at least a portion of attribute data includes data indicating a position in a screen layout area of a media information element associated with the attribute data.

23. A system according to claim 19, wherein a media information element is a portion of information of either one of a character string, a graphic image, a video image, a moving picture, a music piece, and a voice.

24. A system according to claim 23, wherein:

a media information element is a portion of information of a character string; and said at least a portion of attribute data is a size of characters.

25. A system according to claim 23, wherein:

a media information element is a portion of a music piece; and said at least a portion of attribute data is a pitch of tone.

26. A system according to claim 19, wherein a selected number of plural screen layout areas are displayed on a display screen of the display at a same time.

27. A system according to claim 19, wherein all the plural screen layout areas are displayed on a display screen of the display at a same time.

* * * * *